(12) United States Patent
Klein

(10) Patent No.: US 12,434,045 B2
(45) Date of Patent: Oct. 7, 2025

(54) STIMULATION SYSTEM INCLUDING A MULTI-ELECTRODE EAR SHELL AND METHOD OF USING THE SAME

(71) Applicant: The Alfred E. Mann Foundation for Scientific Research, Valencia, CA (US)

(72) Inventor: Valma Klein, Canyon Country, CA (US)

(73) Assignee: THE ALFRED E. MANN FOUNDATION FOR SCIENTIFIC RESEARCH, Valencia, CA (US)

( * ) Notice: Subject to any disclaimer, the term of this patent is extended or adjusted under 35 U.S.C. 154(b) by 198 days.

(21) Appl. No.: 17/410,912

(22) Filed: Aug. 24, 2021

(65) Prior Publication Data

US 2022/0143390 A1 May 12, 2022

Related U.S. Application Data

(60) Provisional application No. 63/112,081, filed on Nov. 10, 2020.

(51) Int. Cl.
*A61N 1/04* (2006.01)
*A61N 1/36* (2006.01)

(52) U.S. Cl.
CPC ......... *A61N 1/0456* (2013.01); *A61N 1/0476* (2013.01); *A61N 1/36014* (2013.01); *A61N 1/36036* (2017.08)

(58) Field of Classification Search
CPC ............... A61N 1/0456; A61N 1/0476; A61N 1/36014; A61N 1/36036; A61N 1/36038; A61N 1/0541; A61N 1/36053; A61N 1/0492; A61N 1/0556; A61N 2005/0605; A61N 1/3756

See application file for complete search history.

(56) References Cited

U.S. PATENT DOCUMENTS

| 2006/0064139 | A1  | 3/2006 | Chung et al. |
| 2009/0123010 | A1* | 5/2009 | Cano ............... H04R 1/1016 381/328 |
| 2010/0239114 | A1* | 9/2010 | Wada ............... A61B 5/6817 381/380 |

(Continued)

FOREIGN PATENT DOCUMENTS

| EP | 3 693 053 A1 | 8/2020 |
| WO | WO 2019/232157 A1 | 12/2019 |
| WO | WO 2022/103466 A1 | 5/2022 |

OTHER PUBLICATIONS

Malfatto, Gabriella et al., "Different baseline sympathovagal balance and cardiac autonomic responsiveness in ischemic and non-ischemic congestive heart failure," The European Journal of Heart Failure, 2001, 197-202, vol. 3, Elsevier, Milan, Italy.

(Continued)

*Primary Examiner* — Benjamin J Klein
*Assistant Examiner* — Daniel Tehrani
(74) *Attorney, Agent, or Firm* — Lewis Roca Rothgerber Christie LLP

(57) ABSTRACT

A multi-electrode ear shell includes an inner surface and an outer surface, the inner surface corresponding to a surface of an ear and being configured to overlap a cymba and a cavum of the ear. The multi-electrode ear shell further includes a first socket to receive a first stimulation electrode and a second socket to receive a second stimulation electrode.

18 Claims, 9 Drawing Sheets

(56) References Cited

U.S. PATENT DOCUMENTS

| | | | | |
|---|---|---|---|---|
| 2017/0027812 | A1* | 2/2017 | Hyde | G16H 10/20 |
| 2017/0087364 | A1* | 3/2017 | Cartledge | A61N 1/18 |
| 2018/0280685 | A1* | 10/2018 | Toy | A61B 5/24 |
| 2018/0311502 | A1* | 11/2018 | Brandmeier | A61B 5/4041 |
| 2020/0203812 | A1* | 6/2020 | Murray | H01Q 9/285 |
| 2021/0196565 | A1* | 7/2021 | Marinakis | A61N 1/36036 |
| 2022/0143390 | A1 | 5/2022 | Klein | |
| 2022/0370786 | A1* | 11/2022 | Atkin | A61N 1/36036 |

OTHER PUBLICATIONS

Yakunina, Natalia et al., "BOLD fMRI effects of transcutaneous vagus nerve stimulation in patients with chronic tinnitus," PLOS|ONE; https://doi.org/10.1371/journal.pone.0207281, Nov. 28, 2018, 18 pages.

Yap, Jonathan Y. Y., et al. "Critical Review of Transcutaneous Vagus Nerve Stimulation: Challenges for Translation to Clinical Practice," Frontiers in Neuroscience, published Apr. 28, 2020, vol. 14, Article 284.

Badran, Bashar W., et al. "Tragus or cymba conchae? Investigating the anatomical foundation of transcutaneous auricular vagus nerve stimulation (taVNS)," Brain Stimul., Author manuscript, 2018; 11(4), 4 pages, available in PMC Jul. 3, 2019.

Butt, Mohsin F.; et al. "The anatomical basis for transcutaneous auricular vagus nerve stimulation," Journal of Anatomy, 2020, vol. 236, pp. 588-611.

Chapleau, Mark W. et al., "Methods of assessing vagus nerve activity and reflexes," National Institute of Health Public Access, Heart Fail rev. Mar. 2011, 16(2), pp. 109-127, available in PMC Feb. 10, 2015.

Badran, Bashar W., et al. "Short trains of transcutaneous auricular vagus nerve stimulation (taVNS) have parameter-specific effects on heart rate," Department of Health and Human Services Public Access, Published as Brain Stimul. 2018; 11(4) : 25 pages, available in PMC May 27, 2019.

Kraus, Thomas et al. "CNS BOLD fMRI Effects of Sham-Controlled Transcutaneous Electrical Nerve Stimulation in the Left Outer Auditory Canal—A Pilot Study," Elsevier, Brain Stimulation vol. 6 (2013) pp. 798-804.

International Preliminary Report on Patentability for PCT Application No. PCT/US2021/047392 dated Jan. 25, 2023, 27 pages.

International Search Report dated Dec. 6, 2021, for corresponding International Patent Application No. PCT/US2021/047392 (5 pages).

Written Opinion dated Dec. 6, 2021, for corresponding International Patent Application No. PCT/US2021/047392 (7 pages).

Canada Examiner Report issued in corresponding application No. CA 3,200,658, dated Jul. 5, 2023, 5 pages.

Australian Office Action issued in corresponding AU Application No. 2021377591, dated Mar. 25, 2024, 5 pages.

* cited by examiner

STIMULATION SYSTEM INCLUDING A MULTI-ELECTRODE EAR SHELL AND METHOD OF USING THE SAME

CROSS-REFERENCE TO RELATED APPLICATION

This application claims priority to and the benefit of U.S. Provisional Application No. 63/112,081, filed on Nov. 10, 2020, entitled "Multi-Electrode Ear Shell For Transcutaneous Auricular Vagal Nerve Stimulation," the entire content of which is incorporated by reference herein.

BACKGROUND

1. Field

Aspects of one or more embodiments of the present disclosure relate to a stimulation system including a multi-electrode ear shell and a method of using the same.

2. Description of Related Art

Transcutaneous Auricular Vagal Nerve Stimulation (taVNS) relies on the cutaneous distribution of vagal afferents at the auricular branch of the vagus nerve (ABVN). Studies exploring the effects of such stimulation have been conducted for various clinical disorders including tinnitus, depression, rheumatoid arthritis, epilepsy, migraines, and atrial fibrillation.

However, there is an existing lack of consensus on which specific auricular locations are most densely innervated by the ABVN and on which sites yield the most success for taVNS. For example, the ear has been identified as a region of interest for taVNS. However, stimulation protocols, stimulation parameters, and effective stimulation sites at the ear for treating a clinical disorder may vary from subject to subject and condition to condition. As a result, manufacturing a variety of custom stimulation apparatuses to treat subjects (also referred to as "patients") and performing studies across a spectrum of subjects may be costly, time consuming, and require frequent visits to an on-site clinician.

The above information disclosed in this Background section is for enhancement of understanding of the background of the present disclosure, and, therefore, it may contain information that does not constitute prior art.

SUMMARY

Aspects of one or more embodiments of the present disclosure are directed towards a multi-electrode ear shell (e.g., a custom, multi-electrode ear shell) for non-invasive, unilateral or bilateral electrical stimulation at various target locations of a patient's right and/or left external ear to optimize transcutaneous stimulation of the ABVN. As a non-limiting example, bilateral stimulation may be used to further study and avoid the effects of direct and asymmetrical stimulation of cardiac motor efferent fibers to avoid potentially causing adverse cardiac events.

Aspects of one or more embodiments of the present disclosure are directed towards a multi-electrode ear shell configured to selectively target and study multiple stimulation sites of a patient's ear including, but not limited to, the cymba, the cavum, the crus of helix, the antihelix, the tragus, and/or the like for taVNS using a single multi-electrode ear shell. Therefore, one or more embodiments of the present disclosure may allow the clinician to provide desired stimulation site(s) for in-clinic study or treatment prior to randomizing a subject into a study and requiring the subject to independently follow a stimulation protocol outside of the clinic. Further, based on feedback (e.g., heart monitoring data) from the subject, the clinician and/or the subject may easily adjust the stimulation parameters and locations using the multi-electrode ear shell.

According to one or more embodiments of the present disclosure, a multi-electrode ear shell includes an inner surface and an outer surface, the inner surface corresponding to a surface of an ear and being configured to overlap a cymba and a cavum of the ear, the multi-electrode ear shell further including: a first socket to receive a first stimulation electrode; and a second socket to receive a second stimulation electrode.

In one or more embodiments, the first socket may align the first stimulation electrode with the cymba, and the second socket may align the second stimulation electrode with the cavum.

In one or more embodiments, the multi-electrode ear shell may include an attachment socket between the first socket and the second socket.

In one or more embodiments, the multi-electrode ear shell may include a third socket to receive a third stimulation electrode, the third socket may align the third stimulation electrode with a tragus of the ear.

In one or more embodiments, the multi-electrode ear shell may include an ear canal opening.

In one or more embodiments, the multi-electrode ear shell may include a first stimulation electrode including: a header to be accommodated in an interior volume of the first socket; and a spring between the header and a rear wall of the first socket to press the header of the first stimulation electrode towards the surface of the ear.

In one or more embodiments, the multi-electrode ear shell may include a protrusion extending into an intertragal notch of the ear.

In one or more embodiments, the multi-electrode ear shell may include a ridge to accommodate an inferior crus of antihelix of the ear. The inner surface may extend from an antitragus of the ear to a triangular fossa of the ear.

In one or more embodiments, the multi-electrode ear shell may include a ridge to accommodate a stem of antihelix of the ear. The inner surface may extend from a tragus of the ear to the stem of antihelix.

In one or more embodiments, the multi-electrode ear shell may include acrylonitrile butadiene styrene.

According to one or more embodiments of the present disclosure, a stimulation system includes a multi-electrode ear shell including: an inner surface corresponding to a surface of an ear and an outer surface opposite to the inner surface, the inner surface being configured to overlap the ear; a first socket to receive a first stimulation electrode; a second socket to receive a second stimulation electrode; and an attachment socket at the outer surface; and a headband coupled to the multi-electrode ear shell via the attachment socket.

In one or more embodiments, the stimulation system may further include a stimulation circuit housed within the headband, the stimulation circuit being configured to be connected to the first stimulation electrode.

In one or more embodiments, the stimulation system may further include a clip electrode connected to the stimulation circuit.

In one or more embodiments, the stimulation circuit may apply stimulation at varying frequencies, programmable waveforms, stimulus intensities, rest periods, and pulse widths.

In one or more embodiments, the first socket may be a perforation extending through the multi-electrode ear shell, the first socket may include a rear wall and sidewalls defining an interior volume to receive the first stimulation electrode.

In one or more embodiments, the stimulation system may further include a first stimulation electrode including a header to be accommodated in the interior volume of the first socket of the multi-electrode ear shell.

In one or more embodiments, the first stimulation electrode may include a connector configured to extend and retract the header of the first stimulation electrode.

In one or more embodiments, the first socket and the second socket may be located such that the first socket and the second socket do not concurrently receive the first stimulation electrode and the second stimulation electrode respectively.

In one or more embodiments, the stimulation system may further include another multi-electrode ear shell coupled to the headband via an attachment socket of the other multi-electrode ear shell, the other multi-electrode ear shell including: an inner surface corresponding to a surface of another ear to overlap the other ear; a first socket to receive a third stimulation electrode; and a second socket to receive a fourth stimulation electrode.

In one or more embodiments, the stimulation system may further include a stimulation circuit housed within the headband, the stimulation circuit may apply concurrent symmetrical stimulation to the ear and the other ear.

This summary is provided to introduce a selection of features and concepts of example embodiments of the present disclosure that are further described below in the detailed description. This summary is not intended to identify key or essential features of the claimed subject matter nor is it intended to be used in limiting the scope of the claimed subject matter. One or more of the described features according to one or more example embodiments may be combined with one or more other described features according to one or more example embodiments to provide a workable method or device.

DETAILED DESCRIPTION

Figure 1:
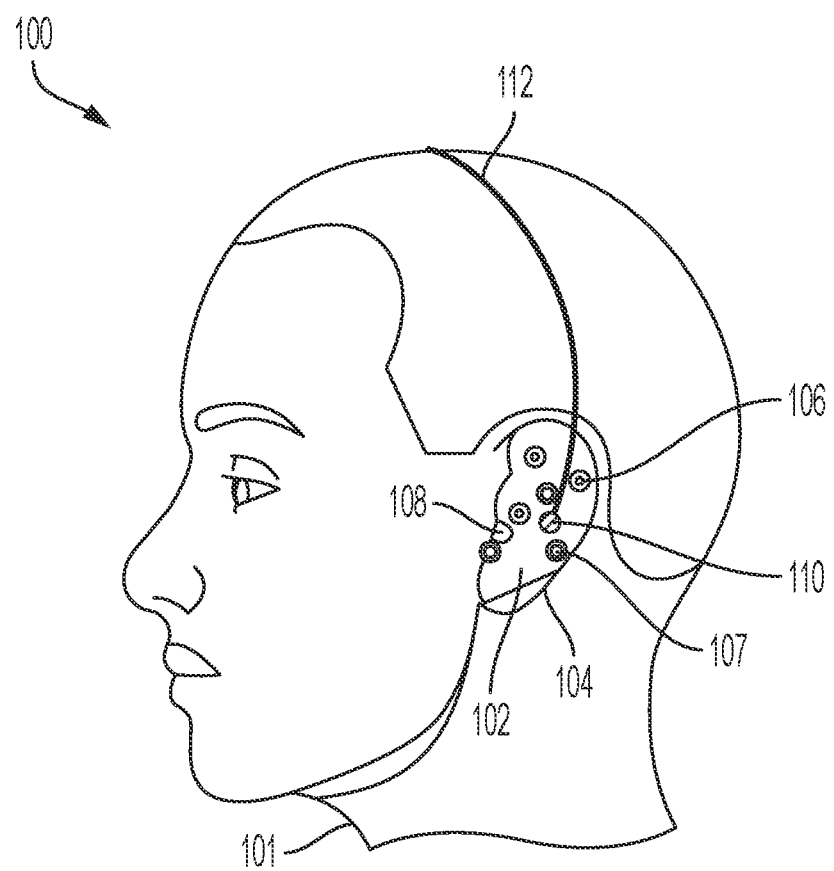
FIG. 1 is a side view of a subject wearing a stimulation system including a multi-electrode ear shell according to one or more embodiments of the present disclosure.

Hereinafter, example embodiments of the present disclosure will be described, in more detail, with reference to the accompanying drawings. The present disclosure, however, may be embodied in various different forms and should not be construed as being limited to only the embodiments illustrated herein. Rather, these embodiments are provided as examples so that this disclosure will be thorough and complete and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and, thus, descriptions thereof may not be repeated.

In the drawings, the relative sizes of elements, layers, and regions may be exaggerated and/or simplified for clarity.

As used herein, the singular forms "a," "an," and "the" are intended to include the plural forms as well, unless the context clearly indicates otherwise.

It is to be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items.

Further, the use of "may" when describing embodiments of the present disclosure refers to "one or more embodiments of the present disclosure".

It is to be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

Spatially relative terms, such as "beneath," "below," "lower," "above," "upper," "bottom," "top," and the like, may be used herein for ease of description to describe one element or feature's relationship to another element(s) or feature(s) as illustrated in the drawings. It is to be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the terms "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It is to be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Aspects of one or more embodiments of the present disclosure provide systems and methods of providing and optimizing transcutaneous stimulation of the auricular branch of the vagus nerve (ABVN) for various clinical disorders including tinnitus, depression, rheumatoid arthritis, epilepsy, migraine and atrial fibrillation. Studies and therapeutic treatments have monitored the effects of taVNS of vagal afferents at the ABVN by evaluating, for example, heart rate, heart rate variability, high frequency (HF) and low frequency (LF) components of power spectral analysis of R-R intervals, and/or the like in an attempt to reflect vagus nerve activity (e.g., sympathetic and parasympathetic activity).

One or more embodiments of the present disclosure enable multiple stimulation sites to be independently, concurrently (e.g., simultaneously), or sequentially evaluated for each subject by providing several areas of contact (e.g., contact with a stimulation electrode) within the external left and/or right ear of the subject using a multi-electrode ear shell. The multi-electrode ear shell enables clinicians to selectively explore and determine the optimal site(s) of stimulation while considering the tolerability and safety of taVNS at various suitable locations assessed for each individual. For example, based on feedback from the subject, the clinician and/or the subject may easily adjust the stimulation parameters and locations using the multi-electrode ear shell without manufacturing a new device.

Therefore, one or more embodiments of the present disclosure may simplify research on the stimulation parameters used at a variety of stimulation sites and effectively respond to the individual anatomy of a subject, thereby providing optimal therapeutic effects for a particular clinical disorder for each subject and facilitating further studies into taVNS of vagal afferents at the ABVN. Accordingly, non-invasive stimulation of vagal afferents at the ABVN may be further promoted, utilized, and studied.

FIG. 1 is a side view of a subject 101 wearing a stimulation system 100 including a multi-electrode ear shell 102 according to one or more embodiments of the present disclosure.

Referring to FIG. 1, a multi-electrode ear shell 102 according to one or more embodiments of the present disclosure may be positioned at (e.g., on or in) an ear 104 of a subject 101. For example, the multi-electrode ear shell 102 may overlap the ear 104 of the subject 101 in a side view of the subject 101.

In one or more embodiments, the multi-electrode ear shell 102 includes one or more electrode sockets 106 and an ear canal opening 108. Each of the one or more electrode sockets 106 may be designed to receive (or accommodate) a stimulation electrode (e.g., a stimulation electrode 107) such that the stimulation electrode may contact a desired location (e.g., the cymba, cavum, crus of helix, antihelix, tragus, auricular acupuncture points, and the like) prior to applying stimulation via the stimulation electrode. In one or more embodiments, the ear canal opening 108 in the multi-electrode ear shell 102 may be a space, gap, or opening defined by an outer edge of the multi-electrode ear-shell as shown in FIG. 1. However, the present disclosure is not limited thereto. For example, the ear canal opening 108 may be a through-hole (e.g., a through-hole having any suitable shape such as a round through-hole, a slot, etc.) defined by an inner edge the multi-electrode ear shell 102. By providing an ear canal opening 108, the multi-electrode ear shell 102 allows the subject 101 to continue with normal daily activities without substantial hearing impairment which may raise the likelihood of compliance with studies and/or treatments using the multi-electrode ear shell 102.

In one or more embodiments, the multi-electrode ear shell 102 may include an attachment socket 110. As shown in FIG. 1, the attachment socket 110 may be a slot or recess for receiving a ball to form a ball and socket connection with a headband 112. However, the present disclosure is not limited thereto and any suitable attachment mechanism may be used. For example, a differently arranged variation of the ball and socket connection, a snap-fit connection, an adhesive, a friction fit, a coupling, and/or the like may be used. Further, in one or more embodiments, the headband 112 may be integrally formed with the multi-electrode ear shell 102 to form a monolithic device or structure.

Figure 2:
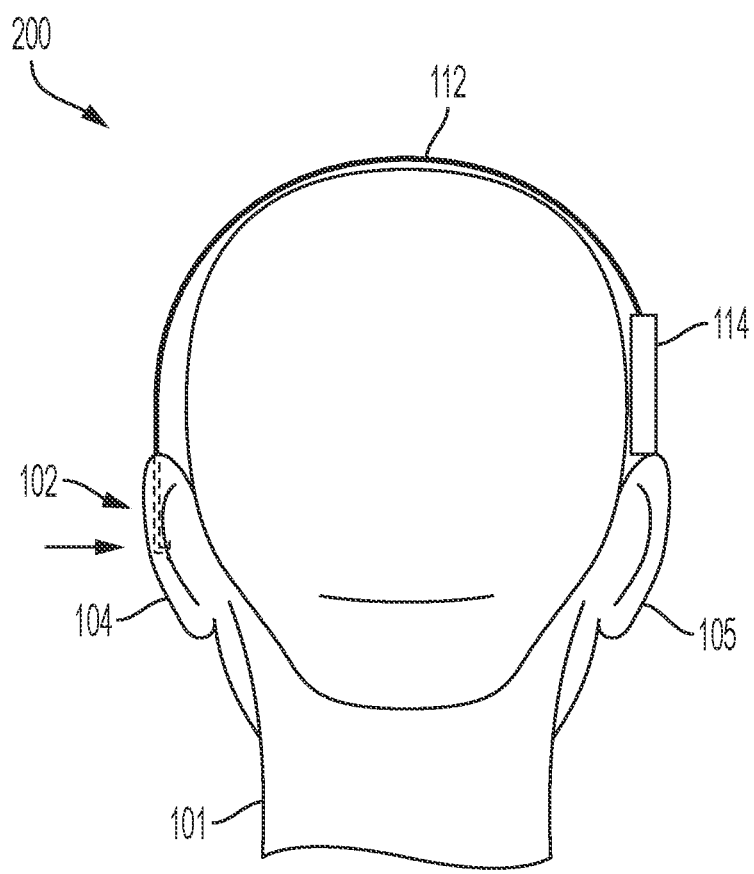
FIG. 2 is a rear view of the subject wearing a stimulation system including a multi-electrode ear shell for unilateral stimulation according to one or more embodiments of the present disclosure.

FIG. 2 is a rear view of the subject 101 wearing a stimulation system 200 including a multi-electrode ear shell 102 for unilateral stimulation according to one or more embodiments of the present disclosure Referring to FIG. 2, the headband 112 may be formed of a rigid material such that an inward pressure or force is applied to the multi-electrode ear shell 102 to fix the multi-electrode ear shell 102 against the ear 104 of the subject 101 as indicated by the arrow in FIG. 2. The headband 112 may be held in position against a head of the subject 101 by a retention member 114 as illustrated in FIG. 2. The retention member 114 may be positioned at a side of the head opposite to another side of the head at which the multi-electrode ear shell 102 is located. In one or more embodiments, the weight and/or the size of the retention member 114 may be set to help balance the headband 112 on the head of the subject 101, and the retention member 114 may adhere to the head of the subject 101 based on, for example, a friction-fit and/or the inward pressure or force applied due to the rigidity of the material used for the headband 112. However, the present disclosure is not limited thereto, and any suitable retention mechanism may be used to prevent displacement of the multi-electrode ear shell 102 during normal daily activities.

Although FIGS. 1 and 2 describe and show a system including a multi-electrode ear shell attached to a left ear 104 of the subject to apply unilateral stimulation, the present disclosure is not limited thereto. For example, the system including the multi-electrode ear shell may be adapted to apply unilateral stimulation to the right ear 105 of the subject 101. Accordingly, throughout the present disclosure, descriptions and illustrations relating to the left ear 104 may be similarly applied to the right ear 105 with suitable changes (e.g., mirrored changes) thereto. Therefore, for ease of description, description relating to the right ear 105 of the subject 101 may not be repeated.

Figure 3:
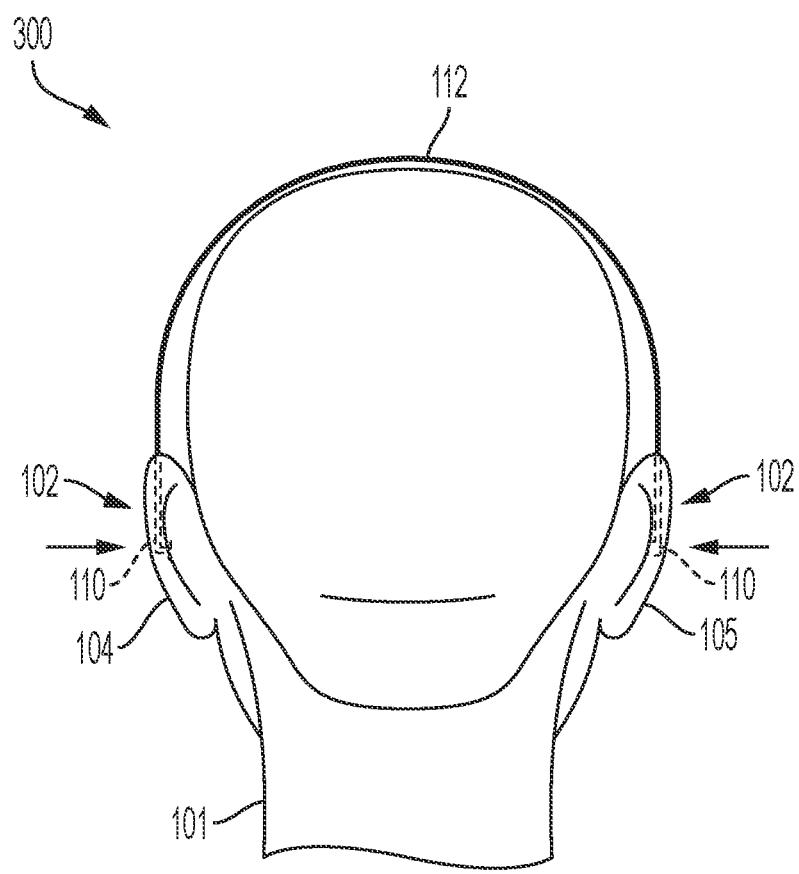
FIG. 3 is a rear view of the subject wearing a stimulation system including a pair of multi-electrode ear shells for bilateral stimulation according to one or more embodiments of the present disclosure.

FIG. 3 is a rear view of the subject 101 wearing a stimulation system 300 including a pair of multi-electrode ear shells 102 for bilateral stimulation according to one or more embodiments of the present disclosure.

Referring to FIG. 3, the headband 112 may be formed of a rigid material such that an inward pressure or force is applied to a pair of multi-electrode ear shells 102 to fix the pair of multi-electrode ear shells 102 against respective ears of the subject 101 as indicated by the arrows in FIG. 3. In one or more embodiments, the multi-electrode ear shells 102 at respective ears may be the same, and in other embodiments, the multi-electrode ear shells 102 may be different from each other depending on differences between the left and right ears 104, 105 of the subject 101, size and shape of the multi-electrode ear shell 102 for each respective ear 104, 105, number of electrodes accommodated by the respective multi-electrode ear shells 102, and/or the like.

Different from the embodiment shown in FIG. 2 which may provide taVNS stimulation at one ear to stimulate the left vagus nerve in the neck area inside the carotid sheath, the embodiment shown in FIG. 3 includes a pair of multi-electrode ear shells 102 for the left and the right ears 104, 105 of the subject 101 to provide (or optionally provide) bilateral transcutaneous ABVN stimulation. Therefore, as a non-limiting example, the effects of bilateral transcutaneous ABVN stimulation may be investigated without direct and asymmetrical stimulation of cardiac motor efferent fibers which may potentially cause adverse cardiac events.

With reference to FIGS. 2 and 3, the headband 112 may include an adjustment mechanism for fitting the headband 112 to the head of the subject 101 and/or adjusting the pressure pressing the multi-electrode ear shells 102 against a corresponding one of the ears 104, 105 of the subject 101. For example, in one or more embodiments, the headband 112 may include telescoping sections to extend or retract the ends of the headband 112 as desired. In such an embodiment, the telescoping sections may be lockable using friction or rachet brakes. However, the present disclosure is not limited thereto, and any suitable adjustment mechanism for fitting the headband 112 to the subject 101 and/or adjusting the pressure pressing the multi-electrode ear shells 102 against a corresponding one of the ears 104, 105 of the subject 101 may be used.

In one or more embodiments, the stimulation system 100, 200, or 300 may further include a sound system to provide taVNS and sound therapy. When combined with taVNS, sound therapy may reduce the severity of tinnitus and lower the level of stress associated to tinnitus. In one or more embodiments, the sound system may include a speaker (e.g., a micro ear speaker) attached to the one or more of the multi-electrode ear shells 102, and, in other embodiments, the sound system may include a stereo headset worn on top of the one or more of the multi-electrode ear shells 102. However, the present disclosure is not limited thereto and any suitable sound system may be used.

Figure 4:
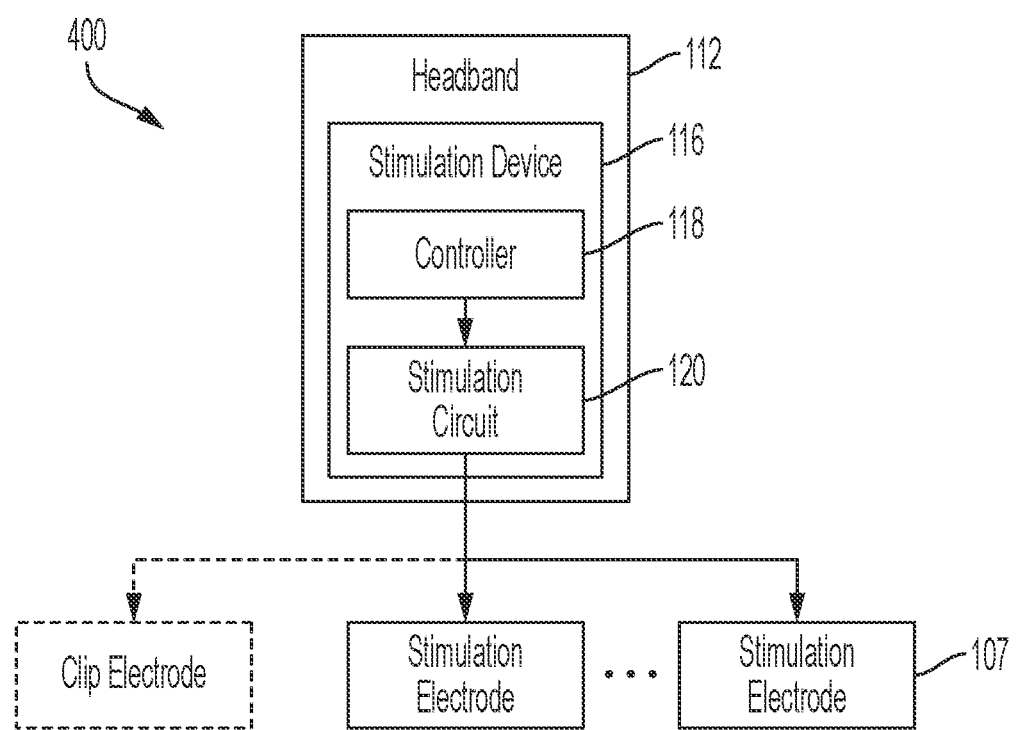
FIG. 4 is block diagram including a headband including a stimulation device according to one or more embodiments of the present disclosure.

FIG. 4 is block diagram 400 including a headband 112 including a stimulation device 116 according to one or more embodiments of the present disclosure.

As shown in FIG. 4, the headband 112 may include a stimulation device 116 (e.g., a multi-channel electrostimulation unit). The stimulation device 116 may include a controller 118 (e.g., a multi-channel stimulation controller) and a stimulation circuit 120 connected to the controller 118. The stimulation circuit 120 may be connected to one or more stimulation electrodes (e.g., the stimulation electrode 107) accommodated in one or more multi-electrode ear shells 102. In one or more embodiments, the stimulation system 100, 200, or 300 may include a clip electrode separate from and spaced from the multi-electrode ear shell as will be described in more detail below. In this case, the stimulation device 116 may be further connected to a clip electrode. However, the present disclosure is not limited thereto. For example, the clip electrode may be connected to a separate stimulation device or may be omitted.

In one or more embodiments, the controller 118 may include a processor, such as a CPU, and a memory device. Logic stored in the memory may be executed by the processor to carry out one or more processes described herein, such as, for example, applying stimulation via the stimulation circuit 120 to one or more electrodes at one or more locations over specific durations (short vs. prolonged), and at varying frequencies, programmable waveforms (e.g., biphasic and/or monophasic waveforms), stimulus intensities, rest periods, and/or pulse widths. Based on the settings of the stimulation device 116 and/or controller 118 of the stimulation device 116, multiple stimulation sites may be independently, concurrently (e.g., simultaneously), or sequentially evaluated for the subject 101. For example, in the embodiment shown in FIG. 3, the controller 118 of the stimulation device 116 may be set to enable concurrent (e.g., simultaneous) symmetrical stimulation at both ears of the subject 101.

In one or more embodiments, the stimulation device 116 (including the controller 118) may be housed within the headband 112, and, in other embodiments, the stimulation device 116 may be outside the headband 112. The stimulation device 116 may be selectively connected to or detached from the one or more stimulation electrodes.

Although the headband 112 is described as including the stimulation device 116, the present disclosure is not limited thereto. For example, stimulation may be applied via a separate stimulation device 116, and therefore, the headband 112 may not include the stimulation device 116. For example, one or more stimulation electrodes of the multi-electrode ear shell 102 may be connected to a separate transcutaneous electrical nerve stimulation (TENS) unit or any other suitable stimulation device. In one or more embodiments, stimulation may be applied both via a stimulation device of the headband 112 and via a separate stimulation device.

Although the headband 112 is described with reference to FIGS. 2-4, any suitable attachment mechanism may be used to fix or attach the multi-electrode ear shell 102 to one or more ears 104, 105 of the subject 101. For example, an attachment member may be used behind-the-ear (e.g., between the ear flap of the subject 101 and the skull of the subject 101) to hold the multi-electrode ear shell 102 in position. In one or more embodiments, the attachment member may be integrally formed with the multi-electrode ear shell 102 and made of the same materials as the multi-electrode ear shell 102. In other embodiments, the attachment member may be a separate structure connected to the multi-electrode ear shell 102 and be made of a different material.

Figure 5A:
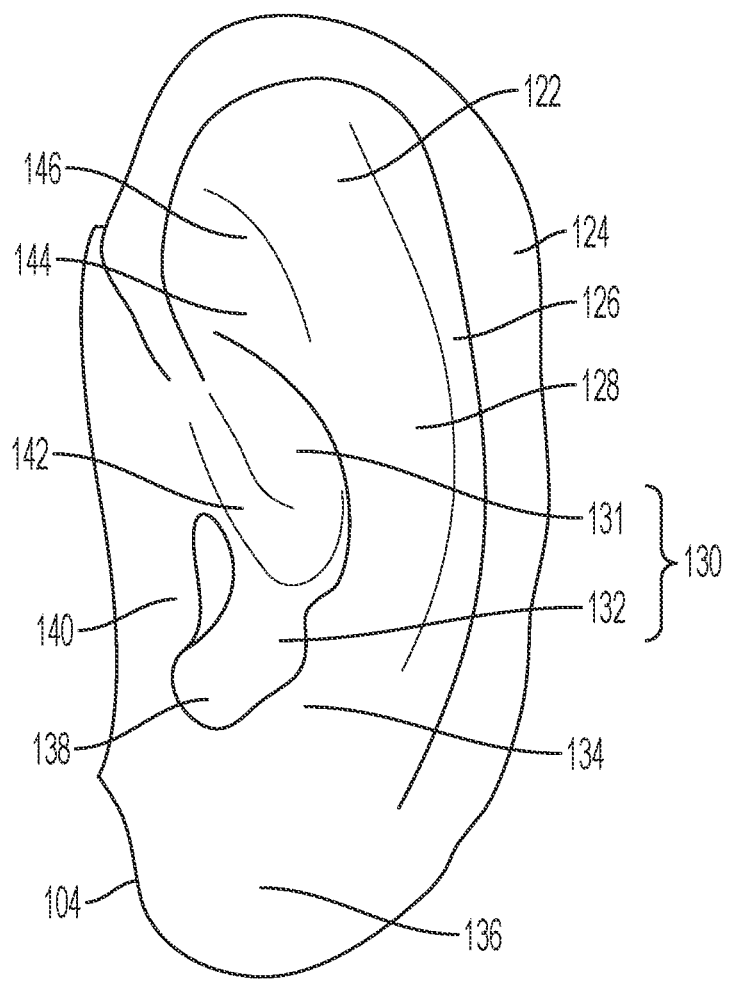
FIG. 5A is an enlarged plan view of an ear of a subject according to one or more embodiments of the present disclosure.

FIG. 5A is an enlarged plan view of an ear 104 of a subject 101 according to one or more embodiments of the present disclosure.

Referring to FIG. 5A, sites of the ear 104 may be identified by a clinician for study and/or treatment. For example, suitable sites for taVNS depending on the goals of the clinician may include, but are not limited to, the superior crus of antihelix 122, helix 124, scapha 126, the stem of antihelix 128, the concha 130 (e.g., the cymba 131 and the cavum 132), antitragus 134, ear lobe 136, intertragal notch 138, tragus 140, crus of helix 142, inferior crus of antihelix 144, and/or triangular fossa 146 shown in FIG. 5A.

In one or more embodiments, a clinician may analyze the ear 104 of the subject 101 to identify regions of the ear 104 to be stimulated. To create a template for a multi-electrode ear shell 102 supporting stimulation of desired sites, the clinician may use a 3D digital image of the ear 104 of the subject 101. The 3D digital image may be generated using any suitable system such as, for example, a 3D ear imaging system directly imaging the ear 104 or a 3D scanner converting a silicone plug molded to the contours of the ear 104 into a 3D digital image.

The 3D digital image may be sized and refined to accommodate the one or more electrode sockets at desired locations, the attachment socket 110 for the headband 112, grounding, and/or the ear canal opening 108. For example, the multi-electrode ear shell 102 may be sized to cover or overlap the locations of desired stimulation sites, a location spaced from the desired stimulation sites for the attachment socket 110, and provide an opening or space for the ear canal opening 108.

In one or more embodiments, the multi-electrode ear shell 102 includes protrusions and/or recesses accommodating specific regions of the ear 104 to prevent or reduce movement of the multi-electrode ear shell 102 during daily activities. For example, the multi-electrode ear shell 102 may include a protrusion or groove corresponding to or contacting the intertragal notch 138 (e.g., see FIG. 5A). By filling or contacting the opening or space between the tragus 140 and antitragus 134 (i.e., the intertragal notch 138) the multi-electrode ear shell 102 may be more securely and accurately fixed to the ear 104 of the subject 101 when the multi-electrode ear shell 102 is attached to the ear 104 of the subject 101.

Further, providing a protrusion at or in the intertragal notch 138 may fix the multi-electrode ear shell 102 such that a stimulation electrode inserted into a socket of the multi-electrode ear shell 102 may consistently and effectively contact the tragus 140 of the ear 104 of the subject 101. Accordingly, a subject 101 may accurately apply a stimulation electrode to the tragus 140 of the ear 104 after attaching the multi-electrode ear shell 102 according to one or more embodiments of the present disclosure. As such, the potential for misapplication of, for example, a clip electrode to the tragus 140 may be reduced. However, the present disclosure is not limited thereto, and in other embodiments the multi-electrode ear shell 102 may provide a socket to receive a stimulation electrode to stimulate the tragus 140 without a protrusion or groove accommodated in the intertragal notch 138. Further, although a stimulation electrode may contact the tragus 140 in one or more embodiments, in other embodiments, a clip electrode that may be used to selectively clamp or contact the tragus 140.

In one or more embodiments, the multi-electrode ear shell 102 may include one or more recesses (or ridges) accommodating the stem of antihelix 128, inferior crus of antihelix 144, superior crus of antihelix 122, and/or antitragus 134. For example, the multi-electrode ear shell 102 may be shaped such that an inner surface of the multi-electrode ear shell 102 (e.g., the surface of the multi-electrode ear shell 102 contacting the ear 104 of the subject 101) corresponds to an inner side of the stem of antihelix 128, inferior crus of antihelix 144, superior crus of antihelix 122, and/or antitragus 134. Accordingly, the multi-electrode ear shell 102 may be shaped such that it does not slip or substantially slip during daily activities.

In accordance with the desired stimulation sites, a clinician may indicate regions of the multi-electrode ear shell 102 to be perforated (e.g., perforated physically or manually) after 3D printing or digitally prior to 3D printing (i.e., printed with the perforations) thereby forming one or more electrode sockets. Accordingly, the multi-electrode ear shell 102 may have a shape, dimensions (e.g., thickness), material, and/or the like suitable for perforation. However, the present disclosure is not limited thereto, and the multi-electrode ear shell 102 may be printed such that perforations may not be accommodated post-printing. Each of the one or more sockets may be aligned with a desired stimulation site such that a header of a stimulation electrode accommodated in each of the one or more sockets may extend to contact the desired stimulation site.

Figure 5B:
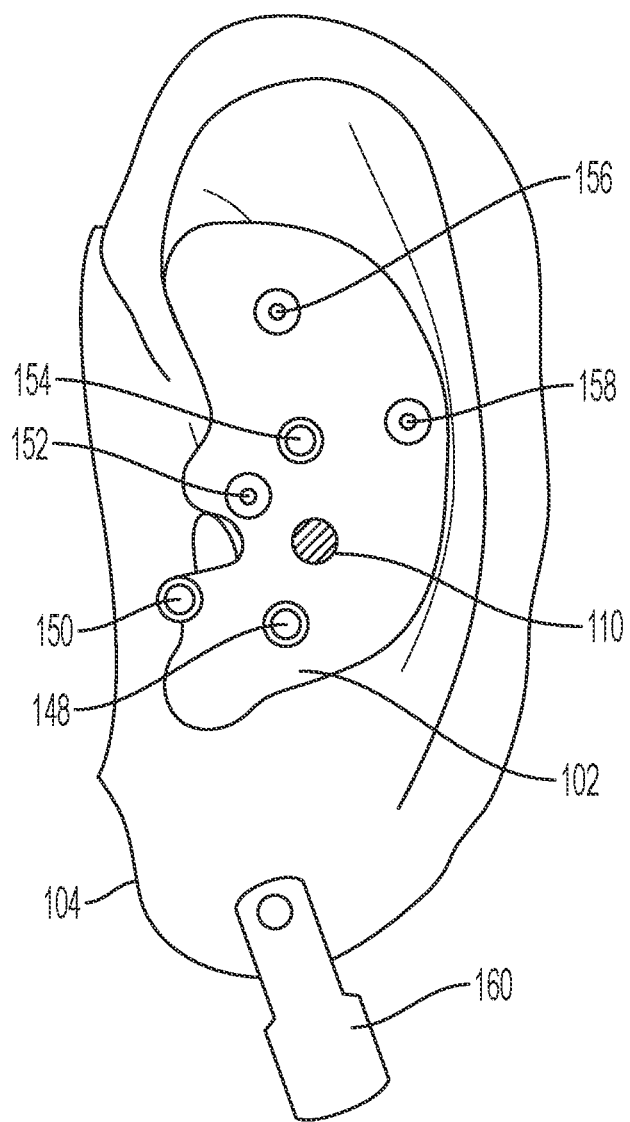
FIG. 5B is an enlarged plan view of a multi-electrode shell fixed to the ear of the subject of FIG. 5A according to one or more embodiments of the present disclosure.

In one or more embodiments, the multi-electrode ear shell 102 may extend from the antitragus 134 to the triangular fossa 146 and from the tragus 140 to the stem of antihelix 128 (e.g., see FIG. 5B). In this case, the one or more electrode socket may be at any suitable region of the ear 104 covered by the multi-electrode ear shell 102. Further, in one or more embodiments, a clip electrode may be provided to apply stimulation to regions of the ear 104 exposed by the multi-electrode ear shell 102 such as, in this case, the ear lobe 136 and helix 124.

Although the multi-electrode ear shell 102 is described with as covering or overlapping specific regions of the ear 104 of the subject 101, the present disclosure is not limited thereto. For example, the multi-electrode ear shell 102 may be sized and refined to cover any portion of the ear 104 of the subject 101 to provide sockets for receiving stimulation electrodes to stimulate the surface of any portion of the ear 104 as desired by the clinician. As another example, in one or more embodiments, the multi-electrode ear shell 102 may extend from the ear lobe 136 to the outermost ends of the ear 104 (e.g., the helix 124) to support stimulation electrodes at any region of the ear 104.

The clinician may also indicate a region for the attachment socket 110 that is centrally located in the multi-electrode ear shell 102 to reduce pressure variation across the ear 104 due to the headband 112 pressing the multi-electrode ear shell 102 against the ear 104. The attachment socket 110 may also be located such that the attachment socket 110 does not interfere with stimulation via the one or more electrodes to be received (or accommodated) in corresponding ones of the one or more electrode sockets.

In one or more embodiments, the attachment socket 110 may be positioned between the cymba 131 and the cavum 132 in a plan view (e.g., a side plan view as shown in FIG. 5B). For example, in the plan view, the attachment socket 110 may overlap or be adjacent to the crus of helix 142 (e.g., adjacent to an end of the crus of helix 142 between the cymba 131 and the cavum 132).

However, the present disclosure is not limited thereto, and the attachment socket 110 may be positioned at any spot of the multi-electrode ear shell 102 as desired. For example, the attachment socket 110 may be at a position of a stimulation electrode socket which the clinician determines does not need to be stimulated. As a non-limiting example, in one or more embodiments, the attachment socket 110 may be at or overlap the cavum 132, cymba 131, crus of helix 142, inferior crus of antihelix 144, and/or triangular fossa 146.

In one or more embodiments, the attachment socket 110 may be located at or overlap positions of the ear 104 that do not substantially flex towards the head of the subject 101 in response to pressure applied by the headband 112. Therefore, the attachment socket 110 may be at or overlap recessed regions of the ear 104 adjacent to an inner side of the stem of antihelix 128, and may not be at or overlapping the ear lobe 136, scapha 126, or helix 124 of the ear 104 adjacent to an outer side of the stem of antihelix 128.

Although only one attachment socket 110 is shown and described with reference to FIGS. 1 and 5B, the present disclosure is not limited thereto. For example, a plurality of attachment sockets may be provided to evenly apply pressure to the ear 104, and therefore, the attachment sockets are not limited to a centrally located position in the multi-electrode ear shell 102. Moreover, the clinician may suitably alter the location of one or more attachment sockets as desired based on the contours and shape of the ear 104 of the subject 101 (e.g. to accommodate ear distortions).

In one or more embodiments, the refined 3D digital image may be used to print a multi-electrode ear shell 102 using any suitable manufacturing or prototyping instrument. The multi-electrode ear shell 102 may be made of any suitable hypoallergenic biocompatible engineering plastic such as, for example, acrylonitrile butadiene styrene (ABS) plastics. The multi-electrode ear shell 102 may be printed to have an inner surface molded to the contours of the ear 104 of the subject 101 and an outer surface for receipt of conductive traces, wires, and the like, and/or an attachment mechanism. Further, because the multi-electrode ear shell 102 is molded to the contours of the ear 104 of the subject 101, a subject 101 or a clinician can consistently and safely place the multi-electrode ear shell 102 on the surface (e.g., the skin) of the ear 104. Moreover, the pressure applied by the headband 112 and the fit of the multi-electrode ear shell 102 may be suitable for normal daily activities without shaking the stimulation electrodes and/or the multi-electrode ear shell 102 loose.

FIG. 5B is an enlarged plan view of a multi-electrode shell 102 fixed to the ear 104 of the subject 101 of FIG. 5A according to one or more embodiments of the present disclosure.

Referring to FIG. 5B, the multi-electrode ear shell 102 may include six electrode sockets 148, 150, 152, 154, 156, 158 respectively aligned with or overlapping the cymba 131, tragus 140, cavum 132, crus of helix 142, inferior crus of antihelix 144, and stem of antihelix 128. The multi-electrode ear shell 102 may further include an attachment socket 110 between the cavum 132 and cymba 131, and an ear canal opening 108 defined by the outer edge of the multi-electrode ear shell 102. The ear canal opening 108 may be between the crus of helix 142 and the tragus 140. As shown in FIG. 5B, three of the six electrode sockets 148, 150, 154 may be occupied by or accommodating a stimulation electrode and the other three of the six electrode sockets 152, 156, 158 may be vacant or unoccupied. In other words, three of six electrode sockets may secure a stimulation electrode such that the corresponding stimulation electrodes are precisely aligned with a surface of the ear 104 at desired locations set by the multi-electrode ear shell 102.

In one or more embodiments, more sockets may be present in the multi-electrode ear shell 102 than the number of stimulation electrodes accommodated by the multi-electrode ear shell 102. Although a stimulation electrode may be accommodated in each of the six electrode sockets 148, 150, 152, 154, 156, 158 concurrently (e.g., simultaneously) as shown in FIG. 5B, in other embodiments, an electrode socket may be close enough to an adjacent electrode socket (e.g., due to the ear 104 of the subject 101, the sites to be stimulated, or the size of the stimulation electrode) such that a stimulation electrode may not fit in the two adjacent sockets at the same time. In this case, the adjacent electrode sockets may still be provided in the multi-electrode ear shell 102 to enable access to the two adjacent sites for the subject to use in different stimulation electrode configurations.

Although specific numbers of electrode sockets and electrodes are provided, the numbers are merely for illustration and the present disclosure is not limited thereto. For example, the number of electrode sockets and electrodes may vary depending on the size of the multi-electrode ear shell, the size of the ear 104 of the subject 101, and/or the planned stimulation protocol.

In one or more embodiments, stimulation electrodes may be selectively removed and added to a corresponding socket from among the one or more sockets. Accordingly, a clinician and/or a subject 101 may easily modify the stimulation system 100, 200, 300 system using the multi-electrode ear shell 102 to comply with a study or respond to feedback from systems monitoring the subject 101.

In one or more embodiments, to remove a stimulation electrode from the multi-electrode ear shell 102 attached to the ear 104, the subject 101 may lift the multi-electrode ear shell 102 away from the ear 104 either by disconnecting the multi-electrode ear shell 102 from the headband 112 or removing the headband 112 with the multi-electrode ear shell 102 attached to the headband 112. The stimulation electrode may be removed by disconnecting the stimulation electrode from the stimulation circuit 120 of the stimulation device 116 and pushing or pulling the electrode in a direction normal to the inner surface of the multi-electrode ear shell 102 (e.g., the surface of the multi-electrode ear shell 102 molded to the surface of the ear 104).

To add a stimulation electrode to the multi-electrode ear shell 102, the subject 101 may insert a stimulation electrode in the direction opposite to the direction normal to the inner surface of the multi-electrode ear shell 102 that is designed to contact the external surface of the ear 104. The stimulation electrode may then be connected to the stimulation circuit 120 of the stimulation device 116 by any suitable conductive material such as, for example, a trace or a wire. The proximity between the stimulation electrode and the surface of the ear 104 of the subject 101 may be adjusted to provide sufficient contact between the stimulation electrode and the stimulation site as will be described in more detail with reference to FIG. 6 below.

Referring back to FIG. 5B, the multi-electrode ear shell 102 as shown in FIG. 5B may accommodate up to six stimulation electrodes for selective taVNS as designated by the clinician. Further, because stimulation electrodes may be selectively removed and added to the multi-electrode ear shell 102, ease of identification of stimulation sites, and alignment with a desired stimulation site is provided without having to design a separate stimulation device 116 and/or request help from a clinician.

In one or more embodiments, as shown in FIG. 5B, a clip electrode 160 may be provided with the stimulation system including the multi-electrode ear shell 102. The clip electrode 160 may be clamped at any desired location of the ear 104 to provide stimulation. For example, as shown in FIG. 5B the clip electrode 160 is clamped or attached to the ear lobe 136. In one or more embodiments, the clip electrode 160 may be connected to the stimulation device 116 of the headband 112, and in other embodiments, the clip electrode 160 may be connected to a separate stimulation device 116. Because the clip electrode 160 may be freely adjusted to clamp or be attached to any suitable location at the ear 104 of the subject 101, stimulation via the clip electrode 160 may be used to, for example, stimulate desired sites that are exposed (i.e., not covered) by the multi-electrode ear shell 102 or one or more sham stimulation sites (e.g., the ear lobe 136) to further investigate and/or test sham stimulation sites to provide additional data for analysis.

In one or more embodiments, different from the embodiment of FIG. 5B, the multi-electrode ear shell 102 may expose (i.e., not cover) portions of the ear 104 (e.g., the tragus 140) that a clinician or a subject 101 may decide would be desirable to stimulate. In this case, instead of creating a new multi-electrode ear shell 102, the clinician and/or the subject 101 may decide to, for example, stimulate the tragus 140 using the clip electrode 160.

Although the clip electrode 160 may be used, referring back to the embodiment of FIG. 5B, the multi-electrode ear shell 102 may be designed to have sufficient applied pressure via the headband 112 to provide sufficient contact to the tragus 140 and five other sides concurrently (e.g., simultaneously) to apply sufficient stimulation without the use of the clip electrode 160.

Although one or more sockets corresponding to potential stimulation sites are described with reference to FIGS. 5A and 5B, the present disclosure is not limited thereto. For example, the multi-electrode ear shell 102 may include one or more sockets at any location desired by the clinician including locations that are not commonly used, identified, or studied.

Figure 6:
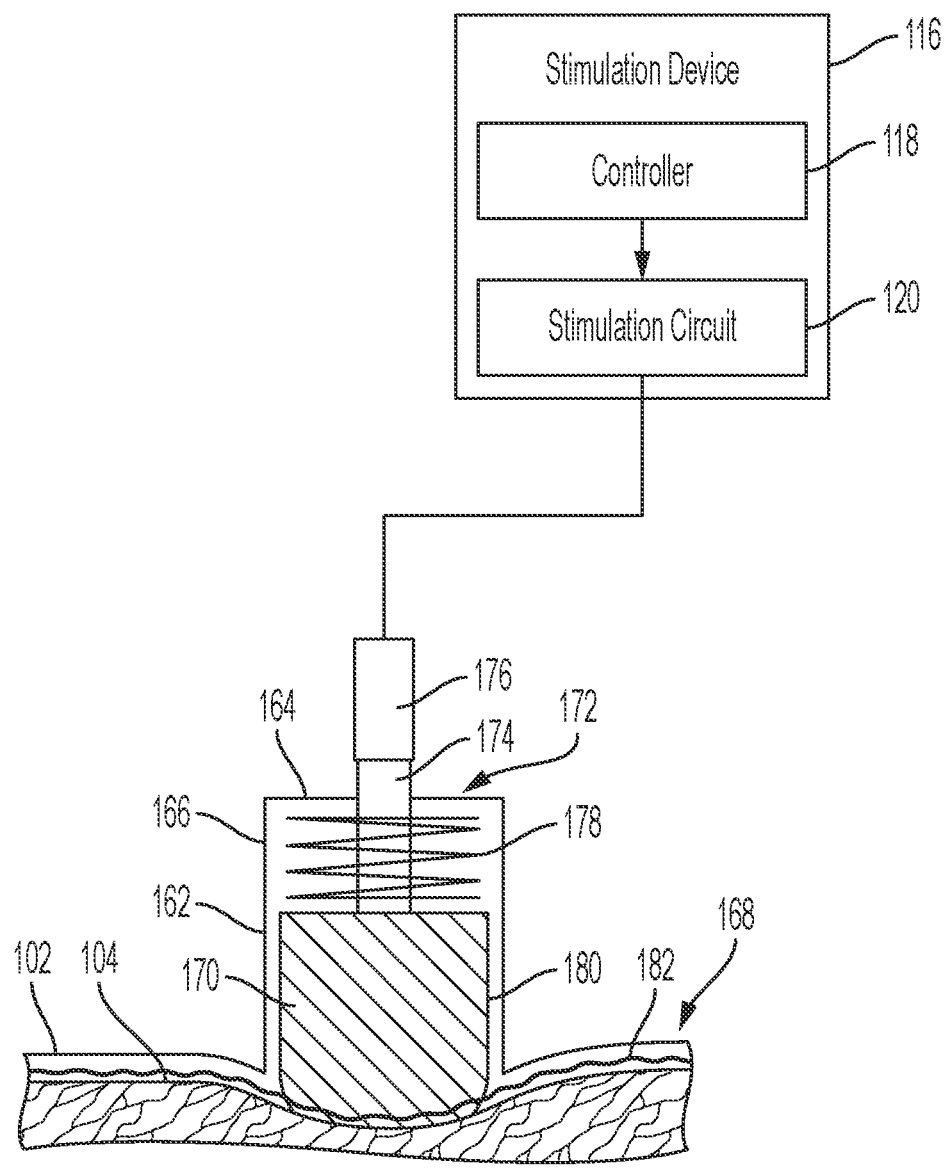
FIG. 6 is a cross-sectional view of a stimulation electrode inside a socket of the multi-electrode ear shell and in contact with an ear of a subject according to one or more embodiments of the present disclosure.

FIG. 6 is a cross-sectional view of a stimulation electrode 170 inside a socket 162 of the multi-electrode ear shell 102 and in contact with an ear 104 of a subject 101 according to one or more embodiments of the present disclosure.

Referring to FIG. 6, the socket 162 of the multi-electrode ear shell 102 may be a recess or perforation including a rear wall 164 and one or more sidewalls 166 defining an interior volume of the socket 162. The one or more sidewalls 166 may extend away from an inner surface 168 of the multi-electrode ear shell to the rear wall 164 and may define a first opening at the boundary between the inner surface 168 of the multi-electrode ear shell 102 and the socket 162. The first opening may be a size suitable for receiving and extracting a stimulation electrode 170. For example, the first opening may have a circular shape with a diameter equal to or greater than the diameter of the stimulation electrode 170.

The rear wall 164 may be a stop and include a through-hole extending through the rear wall 164 to the outer surface 172 of the multi-electrode ear shell 102. The through-hole may be a size and/or shape suitable for receiving portions of a stimulation electrode 170 (e.g., an electrode shaft 174, a connector 176, and/or the like) and/or a conductive material such as a trace or wire; however, the size and/or shape of the through-hole prevents the entire stimulation electrode 170 (e.g., the header 180) from passing through the through-hole. For example, the stop of the rear wall 164 may be adjacent to the through-hole to prevent the entire stimulation electrode 170 (e.g., the header 180) located in the interior volume of the socket 162 from passing through the through-hole.

In one or more embodiments, the stimulation electrode 170 positioned in the socket 162 may include an electrode shaft 174, a header 180 at an end of the electrode shaft 174, a spring 178 encircling the electrode shaft 174, and a connector 176 at the opposite end of the electrode shaft 174.

As shown in FIG. 6, the electrode shaft 174 may extend through the through-hole such that the stop of the rear wall 164 is between the connector 176 and the spring 178. The spring 178 may be made of metal or conductive foam and have an adjustable compression and length to provide sufficient contact between the header 180 protruding through the first opening and the skin and/or conductive gel 182 at the external surface of the ear 104.

In one or more embodiments, the subject 101 may adjust the compression of the spring 178 and extend or retract the header 180 towards or away from the external surface of the ear 104 by turning the connector 176 clockwise or counterclockwise respectively. For example, the spring 178 may be between the header 180 of the stimulation electrode 170 and the rear wall 164 of the socket 162 to press the header 180 of the stimulation electrode 170 towards the external surface (e.g., skin) of the ear 104. In one or more embodiments, the extension/retraction mechanism may function in accordance with a threaded connection, however, the present disclosure is not limited thereto and any suitable mechanism for extending or retracting the header 180 of the electrode by adjusting the connector 176 may be used. Accordingly, the subject 101 and/or a clinician may easily adjust the stimulation electrode 170 to provide sufficient contact between the surface (e.g., the skin) of the ear 104 and the header 180 of the electrode at a desired stimulation site set by the multi-electrode ear shell 102.

The connector 176 may connect the stimulation electrode 170 to a stimulation circuit 120 controlled by a controller 118 of a stimulation device 116 as described above with reference to FIG. 4. Accordingly, stimulation to the stimulation electrode 170 may be provided via the stimulation circuit 120 over specific durations (short vs. prolonged), and at varying frequencies, programmable waveforms (e.g., biphasic and/or monophasic waveforms), stimulus intensities, rest periods, and/or pulse widths.

In one or more embodiments, the stimulation electrode 170 may be made of titanium or silver (Ag)/silver chloride (AgCl). However, the present disclosure is not limited thereto and any suitable material may be used.

In one or more embodiments, the stimulation electrode 170 may be about 2 millimeters (mm) to about 6 mm in diameter and have a flat shape, a ball shape, a square shape, a star shape, and/or the like. However, the present disclosure is not limited thereto, and the stimulation electrode 170 may be any suitable diameter or shape with corresponding changes to the first opening and the through-hole.

Figure 7:
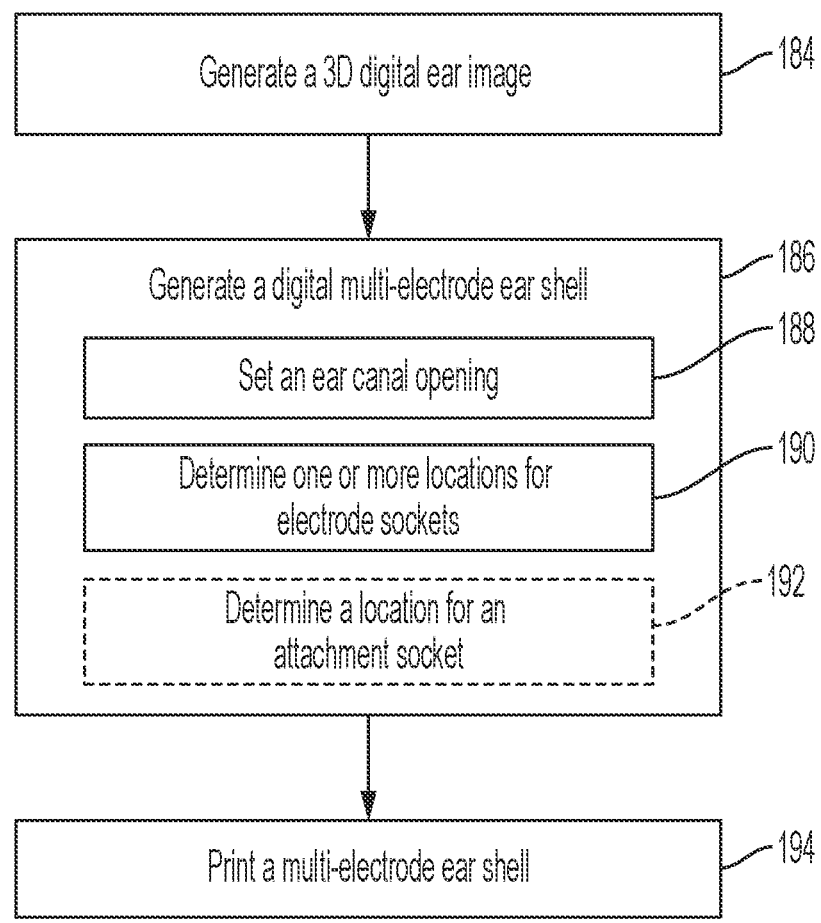
FIG. 7 is a flowchart describing a method of manufacturing a multi-electrode ear shell for a subject according to one or more embodiments of the present disclosure.

FIG. 7 is a flowchart describing a method 700 of manufacturing a multi-electrode ear shell 102 for a subject according to one or more embodiments of the present disclosure.

Referring to FIG. 7, a method 700 of manufacturing a multi-electrode ear shell 102 according to one or more embodiments of the present disclosure includes generating a 3D digital ear image (184). In one or more embodiments, the 3D digital ear image may be generated by scanning or directly imaging the ear 104 of the subject 101 via any suitable 3D ear imaging system. In other embodiments, a silicone plug may be molded to the contours of the ear 104 of the subject 101 and be scanned to generate a 3D digital image.

Based on the 3D digital ear image, a clinician may refine or generate a digital multi-electrode ear shell (186). In one or more embodiments, generating a digital multi-electrode ear shell includes determining the location of an ear canal and providing or setting an ear canal opening 108 for the ear canal (188). The ear canal opening 108 may be present at the outer edge of the multi-electrode ear shell or may be a through-hole surrounded by the multi-electrode ear shell. In one or more embodiments, the ear canal opening 108 may be identified between the crus of helix 142 and the tragus 140.

The clinician may further determine one or more sites of the ear 104 of the subject 101 to be potentially stimulated by a stimulation electrode in accordance with one or more taVNS protocols. The clinician may then determine one or more locations for electrode sockets (190) such that the header of the stimulation electrode in a corresponding electrode socket is suitably aligned with the desired one or more sites of the ear 104 of the subject 101.

In one or more embodiments, in the case where the multi-electrode shell 102 may be attached to a headband 112, the clinician may determine the location for an attachment socket 110 (192). The attachment socket 110 may be centrally located such that pressure is applied substantially uniformly or uniformly to the ear 104 of the subject 101 by the multi-electrode ear shell 102. In one or more embodiments, the attachment socket 110 may be between the cavum 132 and the cymba 131. For example, the attachment socket 110 may overlap or be adjacent to the crus of helix 142 between the cavum 132 and the cymba 131. However, the present disclosure is not limited thereto, and any suitable location may be selected.

Based on the generated digital multi-electrode ear shell, the clinician may print the multi-electrode ear shell 102 (194) using, for example, a 3D printer. In one or more embodiments, the electrode sockets are printed as part of the multi-electrode ear shell 102 using the 3D printer, and in other embodiments, the clinician may manually perforate the multi-electrode ear shell 102 to provide the one or more electrode sockets.

Although a clinician is described with reference to FIG. 7 for manufacturing a multi-electrode ear shell, any suitable individual (e.g., trained or knowledgeable person), automated or semi-automated computer system (e.g., using image recognition software), or computer-assisted individual may perform the above-described acts.

Accordingly, as disclosed herein, embodiments of the present disclosure provide a stimulation system including one or more multi-electrode ear shells 102 for use by clinicians and/or a subject 101 to provide precise alignment and contact between selected stimulation sites as needed for taVNS.

Figure 8:
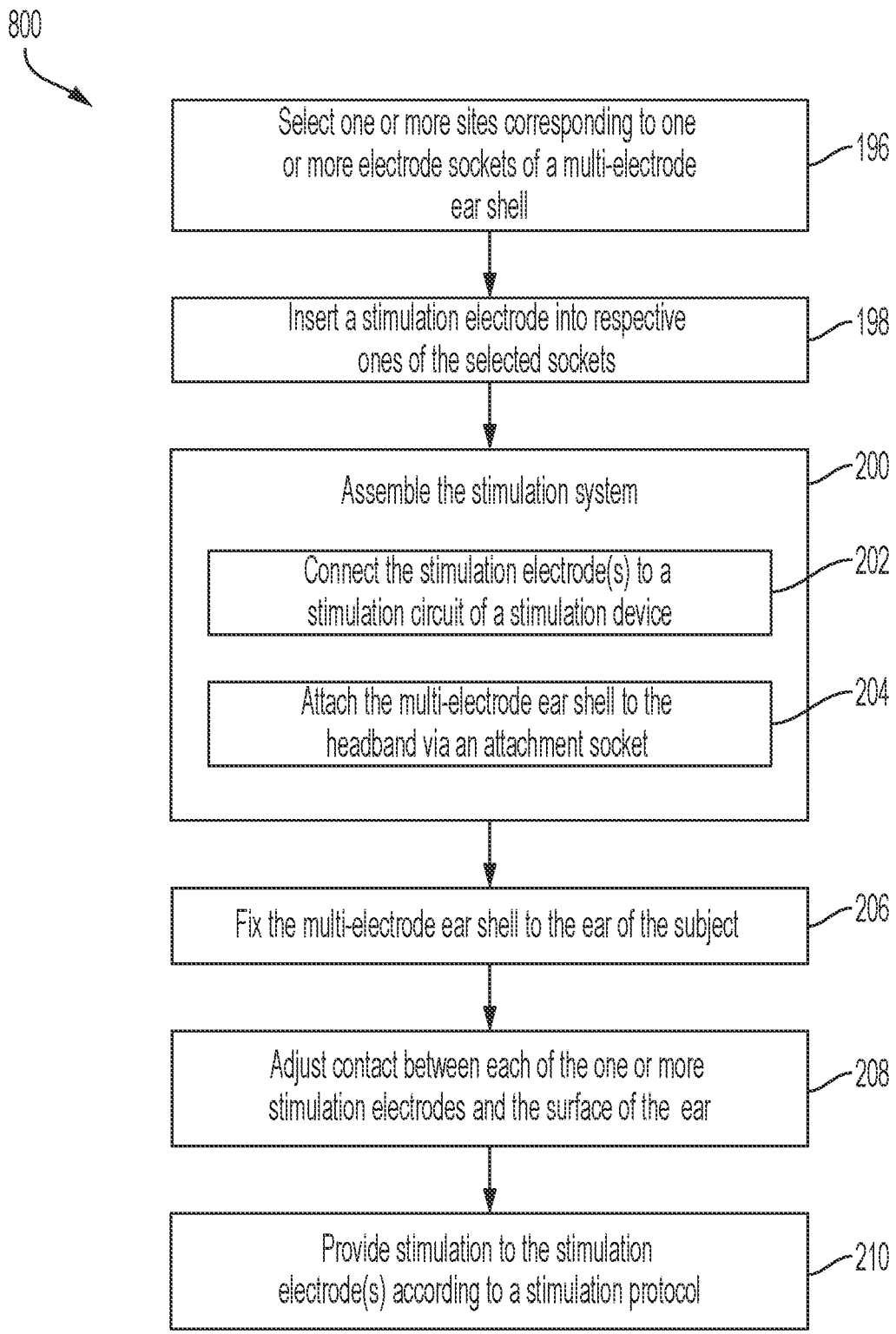
FIG. 8 is a flowchart describing a method of using a multi-electrode ear shell according to one or more embodiments of the present disclosure.

FIG. 8 is a flowchart describing a method 800 of using a multi-electrode ear shell 102 according to one or more embodiments of the present disclosure.

Referring to FIG. 8, a method 800 of using the electrode ear shell 102 according to one or more embodiments of the present disclosure includes selecting one or more sites corresponding to one or more electrode sockets of a multi-electrode ear shell 102 (196) based on a desired stimulation protocol.

In one or more embodiments, a clinician or a subject 101 may insert a stimulation electrode into respective ones of the selected sockets (198). The clinician or the subject 101 may then assemble the stimulation system (200) by connecting one or more inserted stimulation electrodes to a stimulation circuit 120 of a stimulation device 116 (202). The stimulation device 116 may be any suitable stimulation device integrated into the headband 112 or separate from the headband 112. In the case in which the multi-electrode ear shell 102 is fixed using a headband 112, the clinician or the subject 101 may further attach the multi-electrode ear shell 102 to the headband 112 via an attachment socket 110 (204).

In one or more embodiments, the clinician or the subject 101 may apply a conductive gel 182 to the surface (e.g., the skin) of the ear 104 of the subject 101 to enhance the effectiveness of subsequent stimulation. The clinician or the subject 101 may further apply or fix the multi-electrode ear shell 102 to the ear 104 of the subject 101 (206). The clinician or the subject 101 may then adjust contact between each of the one or more stimulation electrodes and the surface (e.g., the skin) of the ear 104 (208). For example, the clinician or the subject 101 may adjust the compression of a spring 178 and extend or retract a header 180 of each stimulation electrode towards or away from the external surface (e.g., skin) of the ear 104 by turning a connector 176 clockwise or counterclockwise respectively. In one or more embodiments, the spring 178 may be between the header 180 of a corresponding stimulation electrode and the rear wall 164 of the corresponding socket to press the header 180 of the corresponding stimulation electrode towards the external surface (e.g., skin) of the ear 104. In one or more embodiments, the extension/retraction mechanism may function in accordance with a threaded connection, however, the present disclosure is not limited thereto and any suitable mechanism for extending or retracting the header 180 of the electrode by adjusting the connector 176 may be used. Accordingly, the subject 101 and/or the clinician may easily adjust the stimulation electrode 170 to provide sufficient contact between the surface (e.g., the skin) of the ear 104 and the header 180 of the electrode at a desired stimulation site set by the multi-electrode ear shell 102.

After the one or more stimulation electrodes are suitably adjusted, stimulation may be provided to the one or more stimulation electrodes according to a stimulation protocol set by the clinician (210).

In one or more embodiments, the stimulation system including the multi-electrode ear shell may be disassembled by the clinician or the subject 101 and the method 800 of using the electrode ear shell 102 may be repeated (i.e., the stimulation system may be reassembled) using different sites corresponding to one or more electrode sockets of a multi-electrode ear shell and a different stimulation protocol.

Accordingly, as disclosed herein, embodiments of the present disclosure provide a stimulation system including one or more multi-electrode ear shells 102 for use by clinicians and/or a subject 101 outside the clinic to provide precise alignment and contact between selected stimulation sites as needed for taVNS.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as set forth in the appended claims, and their equivalents.

What is claimed is:

1. A multi-electrode ear shell comprising:
   an inner surface, an outer surface, and an ear canal opening as a through-hole surrounded by the multi-electrode ear shell extending from the inner surface to the outer surface, the inner surface corresponding to a surface of an ear and being configured to overlap a cymba and a cavum of the ear, the multi-electrode ear shell further comprising:

a first stimulation electrode comprising a header, a spring, and an electrode shaft extending from the header;

a first socket to removably receive the first stimulation electrode, the first socket comprising a rear wall and sidewalls defining an interior volume to removably receive the first stimulation electrode from the inner surface, the sidewalls of the first socket continuously extending from the outer surface of the multi-electrode ear shell, the rear wall of the first socket having a through-hole, wherein the header of the first stimulation electrode is accommodated in the interior volume of the first socket, the spring is between the header and the rear wall of the first socket around the through-hole to press the header of the first stimulation electrode towards the surface of the ear, and the electrode shaft extends through the through-hole in the rear wall to be externally exposed; and a second socket to removably receive a second stimulation electrode, the second socket comprising a rear wall and sidewalls defining an interior volume to removably receive the second stimulation electrode from the inner surface, the sidewalls of the second socket continuously extending from the outer surface of the multi-electrode ear shell.

2. The multi-electrode ear shell of claim 1, wherein:
the first socket is to align the first stimulation electrode with the cymba, and
the second socket is to align the second stimulation electrode with the cavum.

3. The multi-electrode ear shell of claim 2, further comprising an attachment socket between the first socket and the second socket.

4. The multi-electrode ear shell of claim 2, further comprising a third socket to removably receive a third stimulation electrode, the third socket being to align the third stimulation electrode with a tragus of the ear.

5. The multi-electrode ear shell of claim 4, further comprising:
a fourth socket to removably receive a fourth stimulation electrode, the fourth socket being to align the fourth stimulation electrode with a crus helix of the ear;
a fifth socket to removably receive a fifth stimulation electrode, the fifth socket being to align the fifth stimulation electrode with an inferior crus of antihelix of the ear; and
a sixth socket to removably receive a sixth stimulation electrode, the sixth socket being to align the sixth stimulation electrode with a stem of the antihelix of the ear.

6. The multi-electrode ear shell of claim 1, wherein the second stimulation electrode comprises:
a header to be accommodated in an interior volume of the second socket; and
a spring between the header and the rear wall of the second socket to press the header of the second stimulation electrode towards the surface of the ear.

7. The multi-electrode ear shell of claim 1, further comprising a protrusion extending into an intertragal notch of the ear.

8. The multi-electrode ear shell of claim 1, further comprising a ridge to accommodate an inferior crus of antihelix of the ear,
wherein the inner surface extends from an antitragus of the ear to a triangular fossa of the ear.

9. The multi-electrode ear shell of claim 1, further comprising a ridge to accommodate a stem of antihelix of the ear, wherein the inner surface extends from a tragus of the ear to the stem of antihelix.

10. The multi-electrode ear shell of claim 1, wherein the multi-electrode ear shell comprises acrylonitrile butadiene styrene.

11. A stimulation system comprising:
a first multi-electrode ear shell comprising:
an inner surface corresponding to a surface of a first ear, an outer surface opposite to the inner surface, and an ear canal opening as a through-hole surrounded by the first multi-electrode ear shell extending from the inner surface to the outer surface, the inner surface being configured to overlap the first ear;
a first stimulation electrode comprising a header, a spring, and an electrode shaft extending from the header;
a first socket to removably receive the first stimulation electrode, the first socket comprising a rear wall and sidewalls defining an interior volume to removably receive the first stimulation electrode from the inner surface, the sidewalls of the first socket continuously extending from the outer surface of the first multi-electrode ear shell, the rear wall of the first socket having a through-hole,
wherein the header of the first stimulation electrode is accommodated in the interior volume of the first socket, the spring is between the header and the rear wall of the first socket around the through-hole to press the header of the first stimulation electrode towards the surface of the ear, and the electrode shaft extends through the through-hole in the rear wall to be externally exposed;
a second socket to removably receive a second stimulation electrode, the second socket comprising a rear wall and sidewalls defining an interior volume to removably receive the second stimulation electrode from the inner surface, the sidewalls of the second socket continuously extending from the outer surface of the first multi-electrode ear shell; and
an attachment socket at the outer surface; and
a headband coupled to the first multi-electrode ear shell via the attachment socket.

12. The stimulation system of claim 11, further comprising a stimulation circuit housed within the headband, the stimulation circuit being configured to be connected to the first stimulation electrode via the externally exposed electrode shaft.

13. The stimulation system of claim 12, further comprising a clip electrode connected to the stimulation circuit.

14. The stimulation system of claim 12, wherein the stimulation circuit is configured to apply stimulation at varying frequencies, programmable waveforms, stimulus intensities, rest periods, and pulse widths.

15. The stimulation system of claim 11, wherein the first stimulation electrode comprises a connector configured to extend and retract the header of the first stimulation electrode by extending and retracting the spring.

16. The stimulation system of claim 11, wherein the first socket and the second socket are located such that the first socket and the second socket do not concurrently receive the first stimulation electrode and the second stimulation electrode respectively.

17. The stimulation system of claim 11, further comprising a second multi-electrode ear shell coupled to the headband via an attachment socket of the second multi-electrode ear shell, the second multi-electrode ear shell comprising:

an inner surface corresponding to a surface of a second ear to overlap the second ear;
a first socket to removably receive a third stimulation electrode; and
a second socket to removably receive a fourth stimulation electrode.

18. The stimulation system of claim 17, further comprising a stimulation circuit housed within the headband, the stimulation circuit being configured to apply concurrent symmetrical stimulation to the first ear and the second ear.

* * * * *